US 6,739,550 B2

(12) United States Patent
Koizumi et al.

(10) Patent No.: US 6,739,550 B2
(45) Date of Patent: May 25, 2004

(54) FLIGHT CONTROL SURFACE CONTROL UNIT

(75) Inventors: Takashi Koizumi, Gifu (JP); Toshio Kamimura, Gifu (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 10/266,291

(22) Filed: Oct. 8, 2002

(65) Prior Publication Data

US 2003/0080246 A1 May 1, 2003

(30) Foreign Application Priority Data

Oct. 9, 2001 (JP) .................................. P2001-311003

(51) Int. Cl.[7] .............................. B64C 13/24; B64C 9/02
(52) U.S. Cl. ..................... 244/75 R; 244/215; 244/221
(58) Field of Search ................................. 244/212, 213, 244/215, 217, 221, 75 R, 228

(56) References Cited

U.S. PATENT DOCUMENTS 2,743,618 A * 5/1956 Watson et al. ............... 74/99 R
4,932,613 A * 6/1990 Tiedeman et al. ............ 244/213
4,945,779 A * 8/1990 Williams ..................... 74/99 R
4,979,700 A * 12/1990 Tiedeman et al. ......... 244/75 R

* cited by examiner

Primary Examiner—Robert P. Swiatek
(74) Attorney, Agent, or Firm—Akin Gump Strauss Hauer & Feld, L.L.P.

(57) ABSTRACT

A flight control surface control unit controls a swinging angle of a flight control surface of an aircraft by providing a swinging force to the flight control surface and swinging the flight control surface about a pivot. The flight control surface control unit comprises an actuator mounted on an airframe of the aircraft with a final output shaft of the actuator positioned coaxially with the pivot of the flight control surface. The final output shaft of the actuator and the flight control surface are connected to each other. The flight control surface is formed with a recess in the vicinity of the pivot thereof and the actuator is accommodated in the recess.

6 Claims, 4 Drawing Sheets

FLIGHT CONTROL SURFACE CONTROL UNIT

BACKGROUND OF THE INVENTION

The present invention relates to a flight control surface control unit for controlling the swinging angle of a flight control surface by swinging the flight control surface of an aircraft.

Generally, a flight control surface 11 (elevator, rudder, etc.) of an aircraft is swingably supported on an airframe 12 of the aircraft with a pin 13 as shown in FIGS. 5 and 6. Such a flight control surface 11 is swung only by a required angle under the direct control of a pilot during the flight.

In the related art, a hydraulic servo cylinder 14 of a linear drive system, which is reliable and has large output per unit volume, has been used as a control unit for controlling the swinging angle of such a flight control surface 11. A plurality of such cylinders 14, two in this case, are installed in side-by-side arrangement, each head side of the cylinder 14 is rotatably connected to the airframe 12 (main wing, tail wing, etc.) via a pin 15, and the distal end of piston rod 16 thereof is rotatably connected to the distal end of a fixed link 17 projecting from the vicinity of the pivot of the flight control surface 11 via a pin 18.

The linear movement of the piston rod 16 of the cylinder 14 is converted into the rotational movement by means of the fixed link 17, whereby the flight control surface 11 is swung about the pin 13 (pivot). The reference numeral 19 designates a fairing for covering the flight control surface 11, the fixed link 17 projected from the airframe 12, and the cylinder 14, and the fairing 19 includes an airframe side fearing 19a fixed on the airframe 12 and a wing-side fearing 19b fixed on the flight control surface side 11.

However, in such a flight control surface control unit in the related art, since there exists a portion projecting from the flight control surface 11 and the airframe 12 (fixed link 17, cylinder 14), the fairing 19 for covering these portions is required. However, there arises such aproblem that the fairing 19 has high air resistance during the flight, especially, that the air resistance thereof drastically increases in association with recent speeding up of the aircraft, and thus the fuel consumption efficiency drops to a large extent.

SUMMARY OF THE INVENTION

Accordingly, it is an object of the invention to provide a flight control surface control unit that allows improvement of the fuel consumption efficiency by reducing air resistance during the flight.

The object of the invention may be achieved by providing a flight control surface control unit for controlling a swinging angle of a flight control surface of an aircraft by providing a swinging force to the flight control surface and swinging the flight control surface about a pivot. The unit includes an actuator mounted on an airframe of the aircraft with a final output shaft of the actuator positioned coaxially with the pivot of the flight control surface. Further, the final output shaft of the actuator and the flight control surface are connected. The actuator is preferably an oscillating rotary actuator.

Since the final output shaft swings the flight control surface by the use of the actuator (the oscillating rotary actuator) that is coaxial with the pivot of the flight control surface according to the invention, a conversion mechanism (such as a fixed link) for converting the linear movement into the rotational movement as in the related art is not necessary anymore, and thus the fairing for covering the conversion mechanism is not necessary. This allows reduction of air resistance of the aircraft during the flight and thus improvement of the fuel consumption efficiency.

According to the invention as recited in claim 2, the mounting space on the airframe side maybe reduced, which allows achievement of weight reduction and downsizing of the aircraft.

In the case where a plurality of (oscillating rotar) actuators including a drive motor and a gear reducer are provided, and the gears of the gear reducer in any one of (oscillating rotary) actuator are jammed (seized, fixed or the like), rotation of the final output shaft of the jammed (oscillating rotary) actuator is constrained, and thus swinging movement of the flight control surface to be made by the normal (oscillating rotary) actuator is impaired. Therefore, according to the invention as recited in claim 3, a clutch is provided for disconnecting the final output shaft of the (oscillating rotary) actuator from the fixed side when the (oscillating rotary) actuator is jammed and practically freeing rotation thereof. This allows other normal (oscillating rotary) actuators to swing the flight control surface and to continue controlling.

According to the invention as recited in claim 4, jamming between gears, that is, the failure, can be detected easily, and when the failure is corrected, control of the flight control surface may be continued as is.

According to the invention as recited in claim 5, since the connecting point of the clutch, that is, the position of fixed claws and revolving claws, may be stood significantly away from the center of rotation, the connecting force of the clutch may be increased.

According to the invention as recited in claim 6, fluttering of the flight control surface that may occur when all the pluralities of oscillating rotary actuators are broken down may be prevented.

The present disclosure relates to the subject matter contained in Japanese patent application No. P2001-311003 (filed on Oct. 9, 2001), which is expressly incorporated herein by reference in its entirety.

DESCRIPTION OF THE PREFERRED EMBODIMENT

Figure 1:
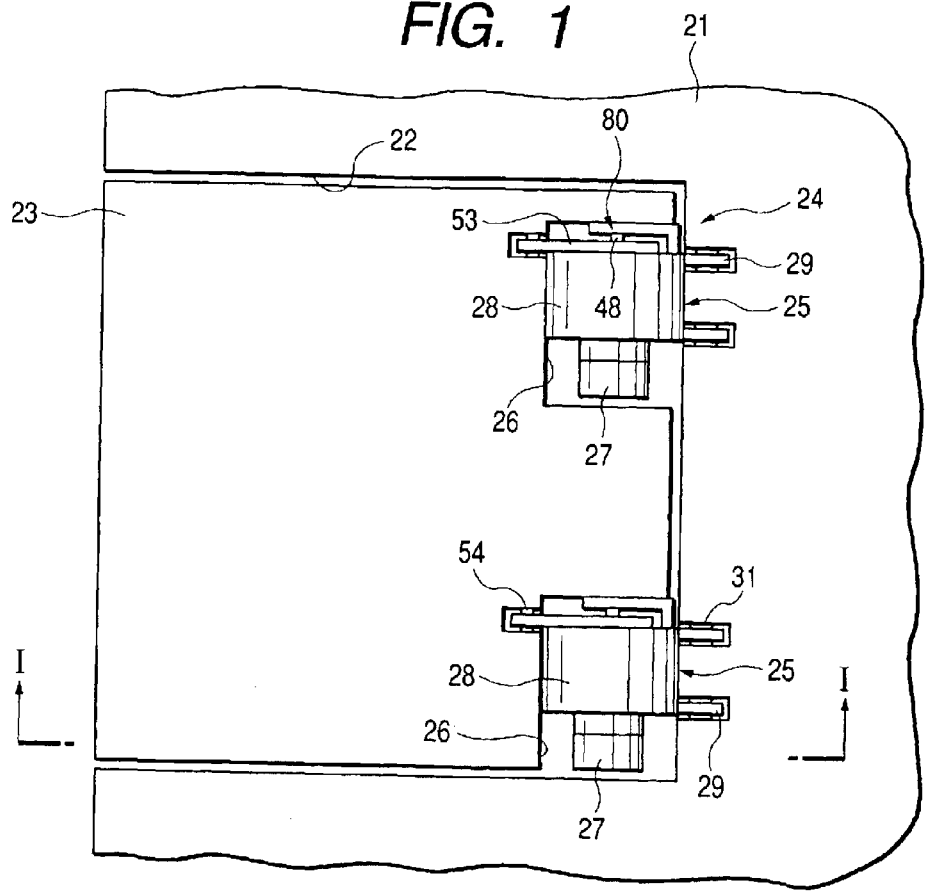
FIG. 1 is a plan view of the portion in the vicinity of a flight control surface showing an embodiment of the invention.

Referring now to the drawings, an embodiment of the invention will be described.

Figure 2:
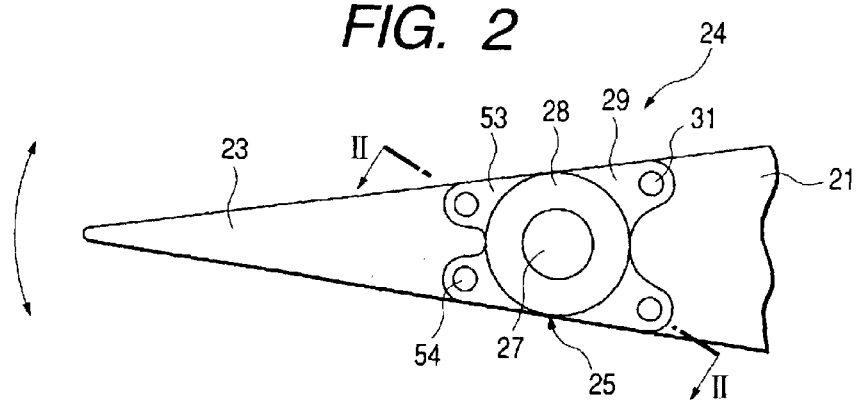
FIG. 2 is a cross sectional view when viewed in the direction indicated by the arrow I—I in FIG. 1.
Figure 3:
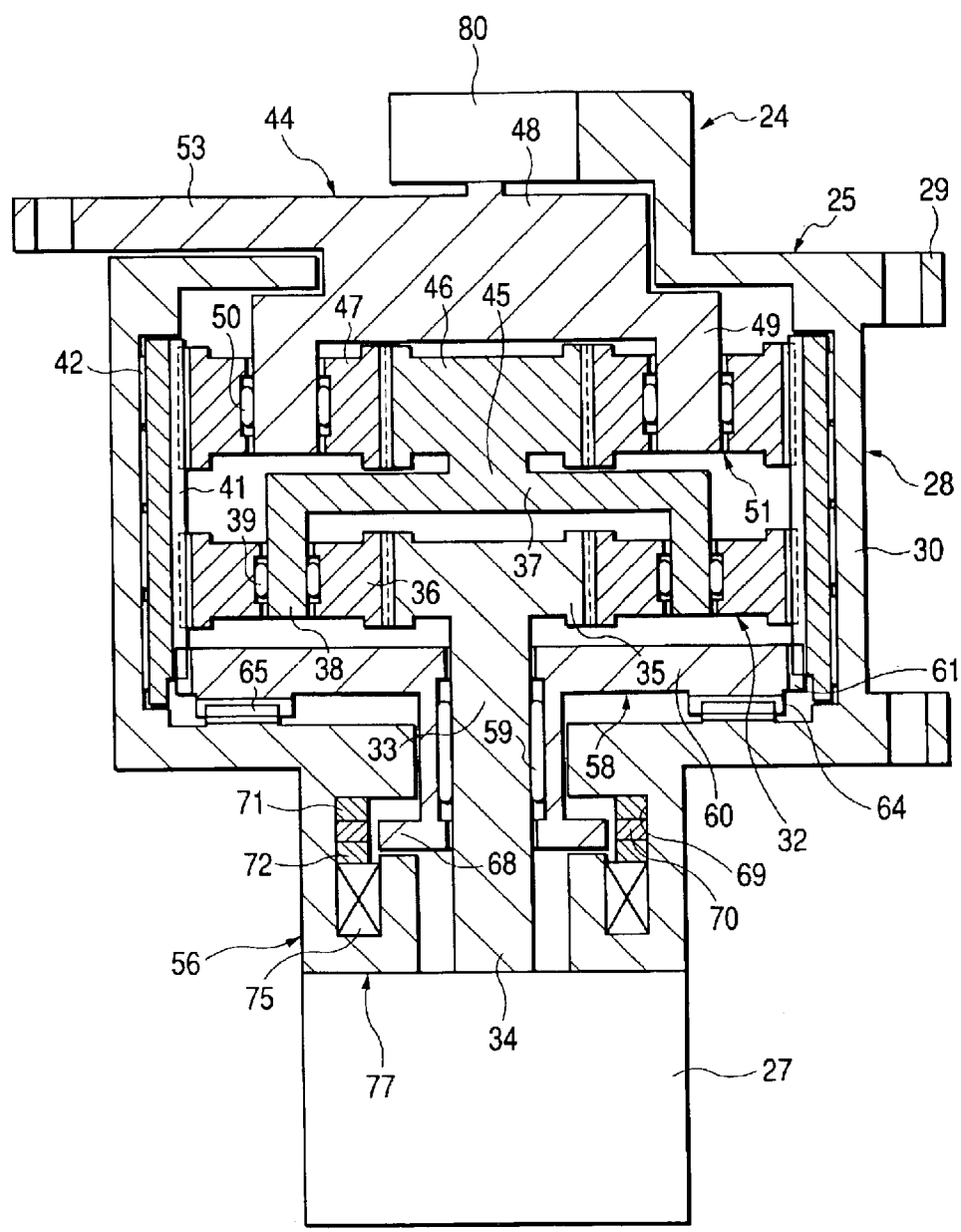
FIG. 3 is a cross sectional view when viewed in the direction indicated by the arrow II—II in FIG. 2.

In FIGS. 1, 2, and 3, the reference numeral 21 designates an airframe of the aircraft, for example, a main wing and a tail wing. The airframe 21 is formed with a rectangular recess 22 at the rear end thereof, and a flight control surface 23, for example, an elevator or a rudder, which is slightly smaller than the recess 22 is arranged in the recess 22.

The reference numeral 24 is a control unit for controlling the swinging angle of the flight control surface 23 by exerting a swinging force to the flight control surface 23 and swinging the flight control surface 23 about the pivot located at the front end thereof. The control unit 24 is provided with a plurality, two in this case, of oscillating rotary actuators 25 located away from each other along the pivot of the flight control surface 23, and the oscillating rotary actuators 25 are accommodated in the rectangular recess 26 formed in the vicinity of the pivot (front end) of the flight control surface 23. This arrangement allows reduction of mounting space of the airframe 21 side, whereby reduction of weight and downsizing of the aircraft is achieved.

The oscillating rotary actuator 25 includes a drive motor 27 such as an electric motor that is controlled by a control unit, and a gear reducer 28 fixed on the drive motor 27. The gear reducer 28 includes a case 30 formed with a plurality of connecting arms 29, and the connecting arms 29 extend forwardly and are connected to the airframe 21 at the distal ends thereof via pins 31.

The reference numeral 132 designates a first reducing mechanism of a planet gear system accommodated in one side of the case 30 located in the vicinity of the drive motor 27. One end of an input shaft 33 of the first reducing mechanism 32 and the other end of the output shaft 34 of the drive motor 27 are directly connected. The first reducing mechanism 32 includes a sun gear 35 formed of an external gear provided at the other end of the input shaft 33 thereof, and planet gears 36 including a plurality of external gears positioned away from each other at regular angles along the periphery of the sun gear 35 and engaged with the sun gear 35. The reference numeral 37 designates a carrier having a plurality of shaft portions 38 loose-fitted in the planet gears 36. The carrier 37 rotatably supports the planet gears 36 via bearings 39 disposed between the planet gears 36 and the shaft portion 38.

The reference numeral 41 designates a cylindrical internal gear rotatably supported via a bearing 42 on the inner periphery of the case 30, and the planet gear 36 engages one side of the internal gear 41. When the internal gears 41 are fixed on the fixed side, on the case 30 in this embodiment, by a clutch that will be described later, and rotation is transmitted from the output shaft 34 of the drive motor 27 to the input shaft 33, and the planet gear 36 moves around the sun gear 35 at a low velocity while being engaged with the internal gear 41. The low-velocity rotational movement is transmitted to the carrier 37 as rotation. The input shaft 33, the sun gear 35, the planet gears 36, the carrier 37, and the internal gear 41 constitute the first reducing mechanism 32 for reducing the velocity of rotation fed to the input shaft 33 and then transmitting to the carrier 37 as a whole.

The reference numeral 44 designates the second reducing mechanism of a planet gear system accommodated on the other side of the case 30 isolated from the drive motor 27. One end of the input shaft 45 of the second reducing mechanism 44 and the carrier 37 are directly connected. The second reducing mechanism 44 includes a sun gear 46 formed of an external gear provided on the other side of the input shaft 45, and planet gears 47 including a plurality of external gears positioned away from each other at regular angles along the periphery of the sun gear 46 and engaged with the sun gear 46. These planet gears 47 engage the other side of the internal gear 41 in the same manner as the planet gears 36. The reference numeral 148 designates a carrier, which corresponds to a final output shaft, having a plurality of shaft portions 49 loose-fitted into the planet gears 47. The carrier 48 rotatably supports the planet gears 47 via bearings 50 disposed between the planet gears 47 and the shaft portion 49.

The internal gear 41, the input shaft 45, the sun gear 46, the planet gears 47, and the carrier 48 constitute the second reducing mechanism 44 that reduces the velocity of rotation transmitted to the input shaft 45 and then transmits it to the carrier 48 by acting in the same manner as the first reducing mechanism. The case 30, the internal gear 41 common for the first and second reducing mechanisms 32, 44, and the gear train 51 accommodated in the internal gear 41 and including the plurality of gears that engages the internal gear 41 directly or indirectly, that is, the sun gear 35, the planet gears 36, the sun gear 46, and the planet gears 47 constitute the gear reducer 28 that reduces the rotation of the drive motor 27 and then transmits it to the carrier 48 that corresponds to a final output shaft as a whole.

The carrier 48 is formed with a plurality of output arms 53 extending rearward, and the distal ends of the output arms 53 are connected to the front end portion of the flight control surface 23 via pins 54. Consequently, when the carrier 48 rotates, the flight control surface 23 swings along with the carrier 48 about the pivot, which is coaxial with the revolving shaft of the carrier 48.

As is described above, both of the oscillating rotary actuators 25 are mounted on the airframe 21 in such a manner that the carrier 48 thereof (final output shaft) is coaxial with the pivot of the flight control surface 23, and the carrier 48 and the flight control surface 23 are connected with each other via the output arm 53. This arrangement allows elimination of the conversion mechanism (such as a fixed link) for converting a linear movement into a rotational movement, which was required in the related art. As a consequent, the fairing for covering the conversion mechanism is not necessary. This allows reduction of air resistance of the aircraft during the flight, and thus improvement of the fuel consumption efficiency.

When the case of the oscillating rotary actuator 25, that is, the case 30 of the gear reducer 28 in this embodiment, is connected to the airframe 21, and the carrier 48 (final output shaft) of the oscillating rotary actuator 25 is connected to the flight control surface 23 to interpose the oscillating rotary actuator 25 between the airframe 21 and the flight control surface 23 as is described above, pins for rotatably supporting the flight control surface 23 on the airframe 21 can be eliminated, thereby simplifying the construction and reducing the weight.

As is described above, in the case where the plurality of oscillating rotary actuator 25 including the drive motor 27 and the gear reducer 28 are provided, and the gears of the gear reducer 28 in anyone of oscillating rotary actuator 25 are jammed, rotation of the carrier 48 (final output shaft) of the jammed oscillating rotary actuator 25 is constrained, and thus swinging movement of the flight control surface 23 to be made by the normal oscillating rotary actuator 25 is impaired.

In order to prevent such inconvenience, the clutch 56 is provided in each oscillating rotary actuator 25 for disconnecting the carrier 48 (final output shaft) of the jammed oscillating rotary actuator 25 from the fixed side when any oscillating rotary actuator 25 is broken down as described above and practically freeing rotation thereof. This allows other normal oscillating rotary actuators 25 to swing the flight control surface 23 to continue controlling.

In this embodiment, the clutch is provided with a slider 58 fitted on one side of the each input shaft 33. The slider 58 is supported on the input shaft 33 so as to be movable in the axial direction, and is rotatably supported on the input shaft 33 via the bearing 59 disposed between the slider 58 and the input shaft 33. Each slider 58 is provided on the other axial end thereof with a supporting disk 60 extending radially outwardly, and the supporting disk 60 is formed on radially outside with external gear 61 engaging all the teeth of the internal gear 41. As a consequence, the slider 58 is axially movably connected to the internal gear 41.

The supporting disk 60 is formed at the radially outer end portion on one side thereof with a plurality of revolving claws 64 positioned away from each other at regular angles along the periphery thereof, and the case 30 opposing to the revolving claws 64 is formed on the inner surface of one side wall with a plurality of fixed claws 65 positioned at regular angles in the peripheral direction. As a consequence, when the slider 58 moves toward axially one side, the revolving claws 64 and the fixed claws 65 engage and rotation of the slider 58 and the internal gear 41 is constrained by the case 30. On the other hand, when the slider 58 is moved toward axially the other side, the revolving claws 64 are disconnected from the fixed claws 65 to enable free rotation of the slider 58 and the internal gear 41.

The slider 58 is provided at one axially end with a disk-shaped armature 68, and the armature 68 is inserted into an annular groove 69 formed on the internal periphery at one end of the case 30, which surrounds the connecting portion between the input shaft 33 and the output shaft 34. The width of the annular groove 69 here is slightly wider than the thickness of the armature 68, and thus as light clearance is formed between both side surfaces of the armature 68 and both side surfaces of the annular groove 69.

The reference numeral 70 designates a ring-shaped permanent magnet accommodated in the annular groove 69. Ring bodies 71, 72 formed of nonmagnetic material are accommodated in the annular groove 69 on both sides of the permanent magnet 70. The inner diameters of the permanent magnet 70, the ring bodies 71, 72 are slightly larger than the outer diameter of the armature 68, and the armature 68 and the permanent magnet 70 are disposed substantially flush with each other in the axial direction.

When the slider 58 and the armature 68 move axially toward one side, the distance between one surface of the armature 68 and one surface of the annular groove 69 is smaller than the distance between the other surface of the armature 68 and the other surface of the annular groove 69. Therefore, a magnet force, which is larger than a force moving armature 68 from the permanent magnet 70 axially toward one side, acts on the armature 68, and thus the slider 58 and the armature 68 are held in a state of being moved axially toward one side.

In contrast to it, when the slider 58 and the armature 68 move axially toward the other side, the distance between the other surface of the armature 68 and the other surface of the annular groove 69 is smaller than the distance between one surface of the armature 68 and one surface of the annular groove 69. Therefore, a magnetic force, which is larger than a force moving the armature 68 from the permanent magnet 70 axially toward the other side, is applied on the armature 68, and thus the slider 58 and the armature 68 are held in the state of being moved axially toward the other side.

The reference numeral 75 is an electromagnetic coil accommodated in the case 30 on one side of the ring body 72. When the electromagnet coil 75 is energized, a magnet flux is generated and a magnetic force larger than a magnetic force of the permanent magnet 70 is given to the armature 68. Therefore, the slider 58 and the armature 68 may be moved axially toward one side or to the other side by controlling the direction of current applied to the electromagnetic coil 75 by the control unit. When a power distributed to the electromagnetic coil 75 is discontinued after such movement, the slider 58 and the armature 68 stop on the side they have moved.

The armature 68, the permanent magnet 70, the electromagnet coil 75, and the portion of the case 30 in the vicinity of the permanent magnet 70 forming a magnet path constitute a movement mechanism 77 for moving the slider 58 in the axial direction as a whole. The slider 58, the revolving claws 64, and the movement mechanism 77 are provided in each oscillating rotary actuator 25 as a whole so as to constitute the clutch 56 for disconnecting the carrier 48 (final output shaft) from the fixed side to practically freeing rotation of the same when the gears in the gear reducer 28 are jammed.

When the clutch 56 is constructed of the slider 58 having revolving claws 64 that allow engagement and disengagement with respect to the fixed claws 65 and the movement mechanism 77 as described above, the connecting point of the clutch 56, that is, the position of the revolving claws 64 and the fixed claws 65, may be stood significantly away from the center of rotation of the actuator 25 radially outwardly. Therefore, the connecting force of the clutch 56 may be increased.

The reference numeral 80 designates a detection sensor such as an encoder, a resolver, or a synchro transmitter fixed on the other end of the case 30 of each gear reducer 28. Such detection sensors 80 detect the rotational position of the carrier 48 (final output shaft), that is, the swinging angle of the flight control surface 23 and output the detected result to the control unit. In this arrangement, since the swinging angle of the flight control surface 23 is detected on the steady basis with the detection sensor 80 as described above, when the swinging movement of the flight control surface 23 stops although a power is being distributed to the drive motor 27 (normally, it is determined to be out-of-order when it is found that excessive current is continuously flowing as a result of monitoring the current values), gears in the gear reducer 28 being jammed and causing a failure of the oscillating rotary actuator 25 can easily be detected. Further, when the oscillating rotary actuator 25 is restored to the normal condition after such jamming is corrected, the swinging angle of the flight control surface 23 at the timing of restoration is detected, and thus control of the flight control surface 23 may be continued as is.

The operation of the embodiment of the invention will now be described.

When the fright control is maneuvered during the flight of the aircraft, the control unit controls power distribution of each oscillating rotary actuator 25 to the drive motor 27 based on the control signal supplied from the flight control, and rotates the output shaft 34 by the prescribed turns in the prescribed direction. At this moment, the slider 58 of the clutch 56 is held in the state of being moved axially toward one side, and thus the revolving claws 64 and the fixed claws 65 are being engaged, and the slider 58 and the internal gear 41 are prevented from rotating by the case 30.

As a consequent, the speed of rotation of the output shaft 34 described above is reduced sequentially and significantly by the first reducing mechanism 32 and the second reducing mechanism 44, and then is transmitted from the carrier 48 that corresponds to the final output shaft to the output arm 53. This exerts a swinging force to the flight control surface 23 thereby swinging the flight control surface 23 about the pivot that is coaxial with the final output shaft to control the swinging angle. Rotation of the carrier 48 (swinging movement of the flight control surface 23) at this moment is detected by the detection sensor 80, and the detected results are supplied to the control unit, whereby the drive motor 27 is feedback-controlled.

When the gears constituting the gear reducer 28, for example, the sun gear 35 and the planet gear 36 are jammed due to entangling of foreign substances in the oscillating rotary actuator for example, all the gears that constitute the gear reducer 28 are united. However, since the internal gear 41 that is constrained in rotation by the case 30 is included therein, the carrier 48 is strongly prevented from rotating. As a consequence, even when other normal oscillating rotary actuator 25 tries to control the swinging angle of the flight control surface 23, the disabled oscillating rotary actuator 25 impairs control of the flight control surface 23, and thus the flight control surface 23 cannot be swung at all.

Figure 4:
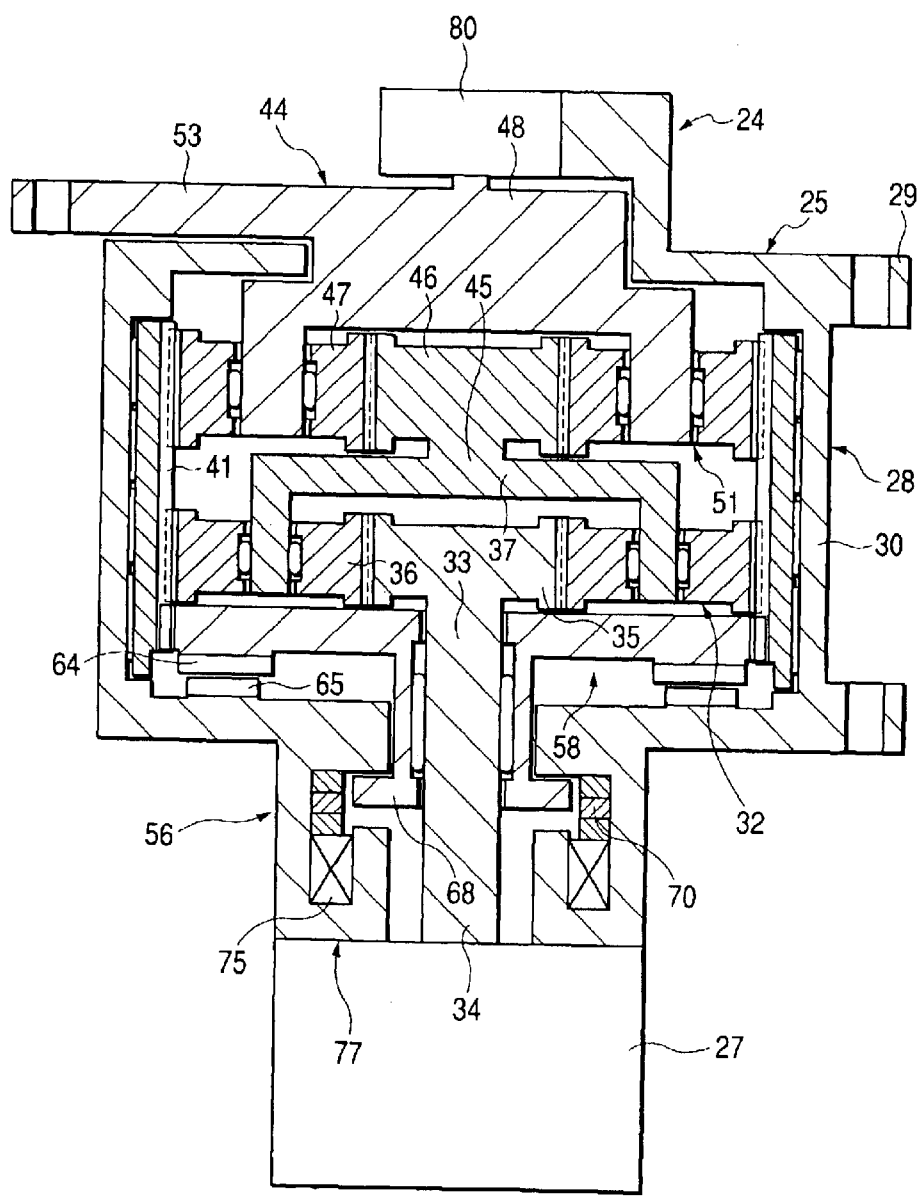
FIG. 4 is a cross sectional view as shown in FIG. 3, showing a state in which a clutch is disengaged.
Figure 5:
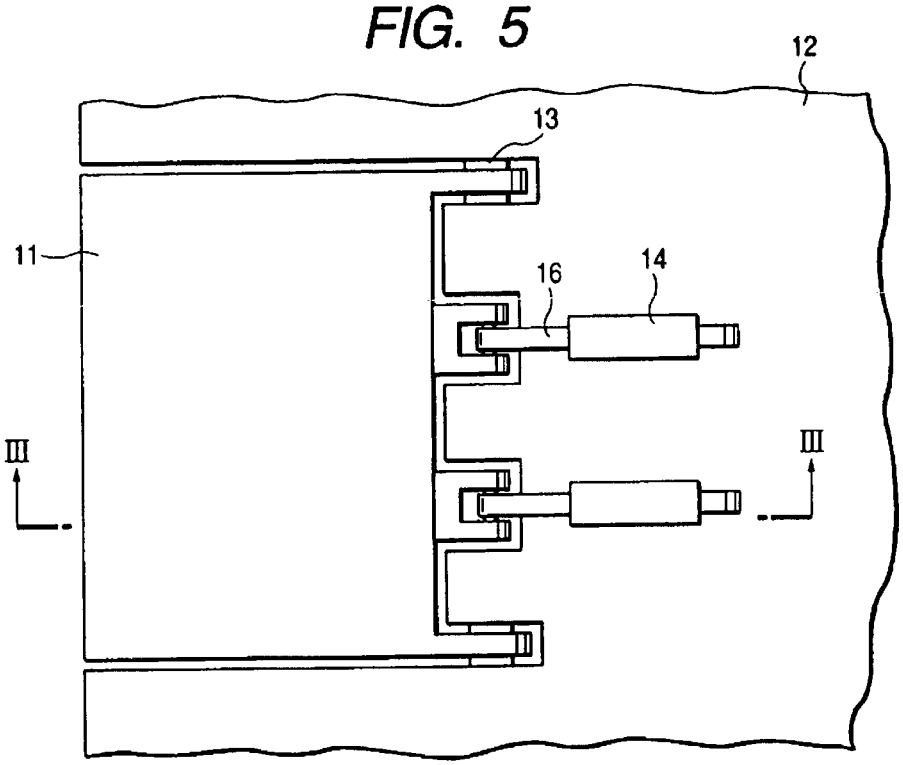
FIG. 5 is a plan view of the portion in the vicinity of the flight control surface shown as an example of the control unit for the flight control surface in the related art.
Figure 6:
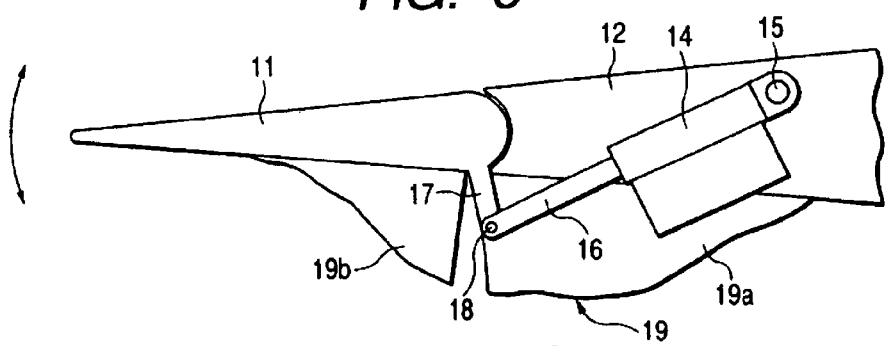
FIG. 6 a cross sectional view when viewed in the direction indicated by the arrow III—III in FIG. 5.

In such a case, since the flight control surface 23 stop swinging although a power is being distributed to the drive motor 27 of the oscillating rotary actuator 25, the control unit determines that a failure is occurred in the oscillating rotary actuator 25 based on the signal detected by the detection sensor 80, and stops power distribution to the drive motor 27. Simultaneously, the control unit distributes a current to the electromagnetic coil 75 in the prescribed direction for a short period of time and applies a magnetic force to the armature 68 by a magnetic flux generated from the electromagnetic coil 75 to move the slider 58 of the clutch 56 axially toward the other side as shown in FIG. 4. When the slider 58 is moved axially toward the other side, the slider 58 is held in this state of being moved axially toward the other side from the reason described above.

When the slider 58 is moved axially toward the other side, the revolving claws 64 are disengaged from the fixed claws 65, and the internal gear 41 and the slider 58 are disconnected from the case 30. As a consequence, at least the carrier 48, or the entire rotating portion of the oscillating rotary actuator 25 (carrier, gears, rotor of the drive motor 27) in this case, is disconnected from the case 30 that corresponds to the fixed side, and thus the rotating portion is practically capable of free rotation. The term 'practically' here implies that it is not complete free rotation because the rotating portion has a relatively large inertial mass, and there exists frictional resistance in the bearing. In such a manner, since the rotating portion of the disabled oscillating rotary actuator 25 is allowed for free rotation, the remaining normal oscillating rotary actuators 25 can continue control of the swinging angle of the flight control surface 23.

When the oscillating rotary actuator 25 is restored to the normal condition after such jamming of the gears in the disabled oscillating rotary actuator 25 is corrected, the swinging angle of the flight control surface 23 at the timing of restoration is detected by the detection sensor 80, and thus the oscillating rotary actuator 25 that is restored to the normal condition can be used for controlling the flight control surface 23 as is.

In the unlikely event of occurrence of jamming in the gears of all the oscillating rotary actuators 25 that has been normally operated, the rotating portions of all the oscillating rotary actuators 25 become free to rotation as described above. However, in such an event, since no force of constraint is applied to the flight control surface 23, it causes fluttering of the flight control surface 23, which makes maneuvering of the aircraft quite difficult.

Therefore, when all the oscillating rotary actuator 25 are broken down, the control unit energizes the electromagnetic coil 75 of at least one of the oscillating rotary actuators 25 to move the slider 58 axially toward one side to bring the revolving claws 64 and the fixed claws 65 into engagement with each other, thereby connecting the clutch 56. This constrains rotation of the rotating portion of the oscillating rotary actuator 25, and thus the flight control surface 23 is fixed at the current swinging angle to prevent fluttering thereof.

When all the oscillating rotary actuators 25 are broken down due to the reason other than jamming of the gears, for example, due to the failure of power source of the drive motor 27, the clutch 56 is brought into engagement in at least in one oscillating rotary actuator 25 as described above. In this case, the drive motor 27 generates an electromotive force since rotation of the flight control surface 23 and the carrier 48 caused by the aerodynamic load is increased in speed by the gear reducer 28 and is transmitted to the rotor of the drive motor 27. This electromotive force acts on the flight control surface 23 as resistance. Therefore, the flight control surface 23 is brought into the state of being applied with a damping force, which also prevents fluttering of the flight control surface 23.

Though an electric motor is used as the drive motor 27 in the embodiment described above, a hydraulic motor or a pneumatic motor may be used in the invention. Though a planet gear type reducer is used as the gear reducer 28 in the embodiment described above, other types of gear reducers, such as an eccentric swinging-type reducer or a harmonic drive may be used. Further, though the clutch 56 is disposed between the rotatable internal gear 41 and the case 30 so as to be capable of engagement and disengagement with each other, it is also possible to provide a commercially available clutch in some midpoint of the final output shaft or between the final output shaft and the flight control surface so as to be capable of engagement and disengagement with each other in the aforementioned embodiment.

The present invention has been discussed with reference to the embodiment in which the two rotary actuators 25 are mounted to the flight control surface 23. The present invention, however, is not restricted thereto or thereby. That is, three or more rotary actuators 25 may be mounted to the flight control surface 23.

As is described thus far, according to the invention, the fuel consumption efficiency may be improved by reducing air resistance during the flight.

What is claimed is:

1. A flight control surface control unit for controlling a swinging angle of a flight control surface of an aircraft by providing a swinging force to the flight control surface and swinging the flight control surface about a pivot, the flight control surface is formed with a recess in the vicinity of the pivot thereof, comprising an actuator mounted on an airframe of the aircraft with a final output shaft of the actuator positioned coaxially with the pivot of the flight control surface, wherein the final output shaft of the actuator and the flight control surface are connected to each other and the actuator is accommodated in the recess.

2. A flight control surface control unit according to claim 1, wherein a plurality of the actuators are provided along the pivot of the flight control surface so as to be separated from each other, wherein each of the actuators comprises a drive motor, and a gear reducer for reducing a speed of rotation of the drive motor to supply the rotation of the drive motor to the final output shaft, and wherein a clutch is provided on each of the actuators for disconnecting the final output shaft from a fixed side to provide practical free rotation when gears in the gear reducer are jammed.

3. A flight control surface control unit according to claim 2, further comprising a detection sensor, provided on the gear reducer, for detecting the swinging angle of the flight control surface.

4. A flight control surface control unit according to claim 2, wherein the gear reducer comprises a case, a cylindrical internal gear rotatably supported on an inner periphery of the case, and a gear train including a plurality of gears accommodated in the internal gear and being engaged with the internal gear, and the clutch comprises a slider connected to the internal gear so as to be capable of moving in an axial direction and formed with revolving claws that engage fixed claws formed on the case when being moved axially toward one side and disengage the fixed claws when being moved axially toward the other side, and a movement mechanism for moving the slider in the axial direction.

5. A flight control surface control unit according to claim 2, wherein the clutch of at least one of the actuators is brought into engagement for preventing fluttering of the flight control surface when all the plurality of oscillating rotary actuators are broken down.

6. A flight control surface control unit according to claim 1, wherein the actuator is an oscillating rotary actuator.

* * * * *